United States Patent [19]

Wood et al.

[11] Patent Number: 5,078,842

[45] Date of Patent: Jan. 7, 1992

[54] PROCESS FOR REMOVING RADIOACTIVE BURDEN FROM SPENT NUCLEAR REACTOR DECONTAMINATION SOLUTIONS USING ELECTROCHEMICAL ION EXCHANGE

[75] Inventors: Christopher J. Wood, Mountain View, Calif.; David Bradbury, Wooton-Under-Edge, United Kingdom

[73] Assignee: Electric Power Research Institute, Palo Alto, Calif.

[21] Appl. No.: 574,267

[22] Filed: Aug. 28, 1990

[51] Int. Cl.⁵ ............................................. C25C 1/22
[52] U.S. Cl. ................................ 204/1.5; 252/626; 210/638; 210/682; 204/141.5
[58] Field of Search .................... 204/1.5, 141.5; 210/638, 682; 252/626

[56] References Cited

U.S. PATENT DOCUMENTS

| | | | |
|---|---|---|---|
| 2,752,309 | 6/1956 | Emmons et al. | 210/682 |
| 3,029,200 | 4/1962 | Sieker | 210/682 |
| 3,198,723 | 6/1960 | Chagnon et al. | 204/299 R |
| 3,533,929 | 10/1970 | Evans et al. | 204/149 |
| 3,650,925 | 3/1972 | Carlson | 204/153 |
| 3,708,508 | 1/1973 | Schulz | 252/364 |
| 3,890,244 | 6/1975 | Carlin | 252/631 |
| 3,922,231 | 11/1975 | Carlin et al. | 252/631 |
| 4,118,317 | 10/1978 | Neeb et al. | 376/314 |
| 4,138,329 | 2/1979 | Kita | 210/26 |
| 4,161,447 | 7/1979 | Kojima | 210/639 |
| 4,234,393 | 11/1980 | Hepworth et al. | 204/1.5 |
| 4,298,477 | 11/1981 | Cole | 210/674 |
| 4,330,386 | 5/1982 | Korinek et al. | 204/223 |
| 4,445,987 | 5/1984 | Benedetto | 204/98 |
| 4,508,641 | 4/1985 | Hanulik | 252/626 |
| 4,512,921 | 4/1985 | Anstine et al. | 252/626 |
| 4,537,666 | 8/1985 | Murray et al. | 252/626 |
| 4,549,985 | 10/1985 | Elliot | 252/631 |
| 4,615,776 | 10/1986 | Sasaki et al. | 204/98 |
| 4,645,625 | 2/1987 | Lundstrom | 252/631 |
| 4,663,085 | 5/1987 | Enda et al. | 252/626 |
| 4,685,971 | 8/1987 | Murray et al. | 134/2 |
| 4,701,246 | 10/1987 | Fujita et al. | 204/130 |
| 4,705,573 | 11/1987 | Wood et al. | 134/3 |
| 4,731,124 | 3/1988 | Bradbury et al. | 134/3 |
| 4,770,783 | 9/1988 | Gustavsson et al. | 210/638 |
| 4,792,385 | 12/1988 | Snyder et al. | 204/140 |
| 4,849,074 | 7/1989 | Stritzke | 204/130 |
| 4,879,006 | 11/1989 | Turner | 204/1.5 |
| 4,880,595 | 11/1989 | Matsuda et al. | 376/313 |
| 4,882,018 | 11/1989 | Tison | 204/105 R |
| 4,891,116 | 1/1990 | Stritzke et al. | 204/241 |
| 4,895,678 | 1/1990 | Ohtsuka et al. | 252/632 |

OTHER PUBLICATIONS

G. H. Swope et al., "Cation Exchange Removal of Radioactivity from Waste" Jan. 55, Ind. Eng. Chemistry, pp. 78–82.

A. D. Turner, et al., "Electrical Processes for the Treatment of Liquid Wastes," Spectrum '86, Proceedings of the American Nuclear Society International Topical Meeting, Waste Management and Decontamination and Decommissioning (Sept. 1986) pp. 199–209.

A. D. Turner, et al., "Electrochemical and Ion-Exchange Processes," Radioactive Waste Management and Disposal, Proceedings of the Second European Community (1985), pp. 53–70.

A. D. Turner, et al., "Electrochemistry and Radioactive Wastes," Atom 327 (Jan. 1984), pp. 14–17.

A. D. Turner, et al., "Electrical Processes for Liquid Waste Treatment," United Kingdom Atomic Energy Authority (Aug. 1987).

Primary Examiner—Brooks H. Hunt
Assistant Examiner—Ngoclan T. Mai
Attorney, Agent, or Firm—Limbach, Limbach & Sutton

[57] ABSTRACT

Spent nuclear reactor coolant system decontamination solutions are processed to remove the radioactive burden and to separate metallic impurities using ion exchange resins within an electrochemical cell. The application of electric current to the electrochemical cell causes hydrogen ions to replace captured cations held on the ion exchange resin, thereby regenerating the resin for subsequent processing. The displaced cations migrate into the cathode compartment. The radioactive burden and metallic impurities are removed from the cathode compartment of the electrochemical cell. In a particularly preferred process, the cations are plated onto the cathode and disposed of as solids.

13 Claims, 2 Drawing Sheets

PROCESS FOR REMOVING RADIOACTIVE BURDEN FROM SPENT NUCLEAR REACTOR DECONTAMINATION SOLUTIONS USING ELECTROCHEMICAL ION EXCHANGE

TECHNICAL FIELD

This invention relates generally to the treatment of spent decontamination solutions to remove their radioactive components, and more specifically this invention relates to the combined use of an electrochemical cell and ion exchange resins to selectively isolate the radioactive and metallic components of the spent decontamination solutions to permit recycle of the decontamination solutions and to minimize the volume of radioactive waste which must be disposed.

BACKGROUND OF THE INVENTION

Decontamination of sub-systems of LWR plants has now become relatively common in the United States, and is widely recognized as a useful contributor to the reduction of radiation exposure of workers at these plants. Sub-system decontamination involves exposing a part of the reactor circuit to chemical solutions which dissolve the radioactive deposits which have built up on process equipment, including piping. The spent decontamination solutions are then treated by ion exchange to retain all of the chemical and radioactive burden of the solution on the resin, while clean water is returned to the system. LOMI is one example of a sub-system decontamination process having these characteristics.

The ion exchange resin carrying the radioactive burden is normally managed by dewatering or solidification of the resin in cement based matrices, for shipment off-site to an appropriate burial location. Since ion exchange resins have a limited capacity for radioactivity and chemicals, a majority of material sent for off-site disposal and burial is the ion exchange resin itself and its binding matrix rather than the radioactive waste materials which the ion exchange was intended to remove. It is therefore desirable to have a waste treatment process which will isolate the radioactive burden in a more concentrated solid matrix than the ion exchange resin presently in use.

The chemicals used in the decontamination processes are normally used in a "once-through" manner, i.e., the chemical is added to the decontamination circuit and is subsequently removed along with the radioactive burden on ion exchange resins. The chemicals are not altered or consumed to any significant extent during decontamination. It would therefore be desirable to use, recover and reuse chemicals for several decontaminations.

SUMMARY OF THE INVENTION

The radioactive and chemical burdens of spent decontamination solutions can be isolated in concentrated deposits by using an electrochemical cell which combines ion exchange, electrodialysis, and electrochemical reactions. In this technique, the cation exchange resin normally used in the treatment of spent decontamination solutions is held in a central compartment surrounded by cation-permeable membranes which have specific properties for transport of ionic species. After, or during the process of flowing the spent decontamination solution through the cation exchange resin, electric current is flowed between electrodes in anode and cathode compartments of the electrochemical cell. These compartments are placed on opposite sides of the central compartment containing the cation exchange resin. The applied electric current causes migration of radioactive ions from the cation exchange resin in the central compartment to the cathode compartment. The same electric current can be used to deposit radioactive ions as metal on the cathode for disposal as a solid.

According to the present invention, as the cation exchange resin in the electrochmical cell becomes partially loaded with radioactive metal ions during the processing of spent decontamination solutions, the cation exchange resin can be completely regenerated by continued operation of the electrochemical cell after the spent decontamination solution processing is complete.

An object of this invention is to use relatively small amounts of cation exchange resin as an intermediate on which to "catch" the radioactive metal ions contained in the spent decontamination solution before processing them into either an inorganic precipitate or a solid metallic waste convenient for encapsulation and burial.

It is an object of this invention to improve the waste management of decontamination processes by permitting the recycling of ion exchange resin, as a reusable intermediate device rather than as the final waste form.

While the present invention was specifically developed for the economic improvement of the LOMI decontamination process, it is capable of being applied to other dilute chemical decontamination processes, as will be readily apparent to those of ordinary skill in the art. The concept could also be broadly applied to the regeneration and recycling of other (non-decontamination) spent resins, and to the release and collection of decontamination chemicals held on ion exchange resins.

DETAILED DESCRIPTION OF THE INVENTION

Iron and chromium bearing deposits build up on nuclear power plant cooling system surfaces. These deposits contain radioactive materials, making their routine and safe removal desirable for maintenance and repair of the cooling systems. Typically, these deposits are treated with an oxidizing solution to remove chromium from the deposits, followed by a decontamination solution which is an aqueous solution of chelate (EDTA, HEDTA, or nitro triacetic acid) and a solubilizing agent (oxalic acid, citric acid and their mixtures.) See U.S. Pat. No. 4,792,385.

Another waste stream which can be treated according to the process of the instant invention is the decontamination solution from the LOMI process described in U.S. Pat. No. 4,705,573. In this process, the decontamination solution contains vanadous formate, picolinic acid and sodium hydroxide.

In addition to routine maintenance of the reactor subsystems, it is sometimes necessary to take some of the process equipment out of service permanently. There are presently efforts underway to develop effective decontamination solutions which will permit the classification of process equipment taken out of nuclear reactor service as standard industrial waste rather than as radioactive wastes. This type of decontamination treatment uses solvents to dissolve the radioactive contaminants adhered to the surface of the metal pieces, as well as to dissolve the surface layers of the metal pieces to insure safe handling of the treated metal pieces. One such process disclosed in U.S. Pat. No. 4,663,085 teaches the use of aqueous nitric acid containing tetravalent cerium ions for this purpose.

The present invention is capable of treating all types of liquid wastes containing radioactive components. The only specification for these solutions is that the radioactive components and metal components must be separable from the bulk of the waste stream by ion exchange. The scope of the present invention should not be limited to radioactive waste management, but its principles can be equally applied to a variety of other industrial waste streams in which it is desired to separate metals from solvents.

Figure 1:
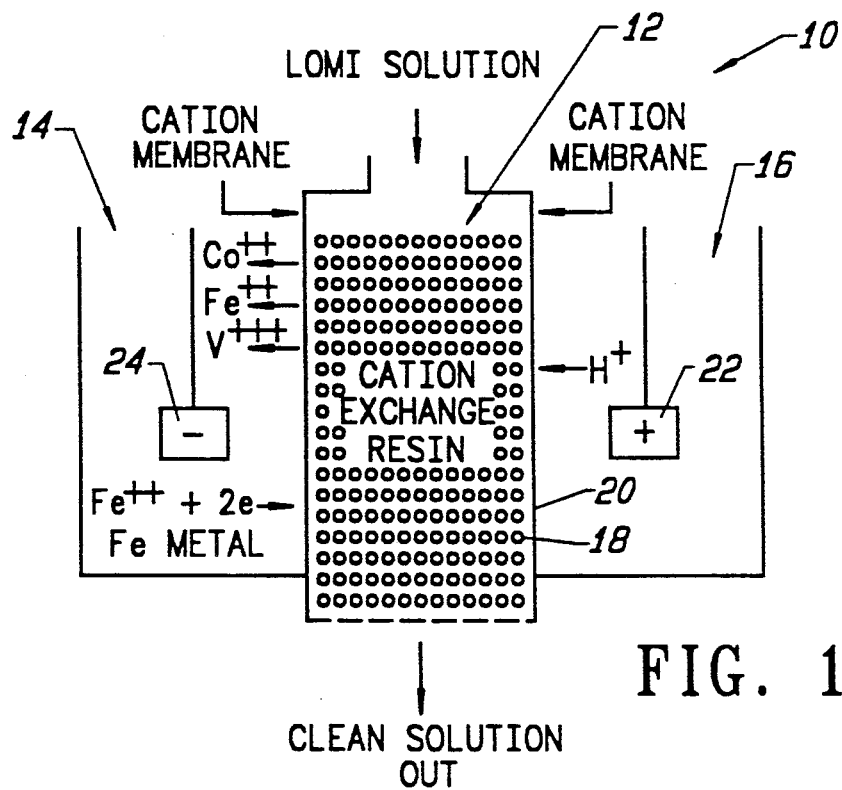
FIG. 1 is a schematic representation, in cross-section, of an electrochemical cell according to the present invention.

The apparatus required to practice the process of the instant invention is constructed from conventional components. An electrochemical cell 10 has a central compartment 12, a cathode compartment 14 and an anode compartment 16, as shown in FIG. 1. The central compartment 12 contains cation exchange resin 18, and is bounded by a cation-permeable membrane 20. The cathode compartment 14 and anode compartment 16 are in ion-communicating relationship with the central compartment 12. The anode and cathode compartments do not directly contact each other except through the central compartment 12.

In a preferred embodiment, the anode 22 is constructed from, or coated with a precious metal. Platinum or other commonly available industrial anodes such as platinum or ruthenium dioxide coated on titanium are particularly preferred. The cathode 24 is preferably constructed from an inexpensive conductive metal such as stainless steel. The cathode is intended to act as a plating surface for exchanged cations and is destined to be buried as the major bearer of the radioactive burden as part of the overall waste management program.

Some other constituents used in the process are chemical in nature. An electrochemical cell 10 can operate under applied current, only if the electrochemical cell contains electrolytes. The selection of appropriate electrolytes for use in a particular process is dependent upon the metals to be separated, the concentration of the metals in the overall waste stream, and the composition of the waste stream. Once all of these parameters are fixed in any particular process, the selection of an electrolyte(s) is within the skill of the ordinary artisan.

In the present invention, at the outset of the process, the anode compartment 16 and cathode compartment 14 both contain electrolytes. In a particularly preferred embodiment, the electrolyte used in both compartments is formic acid, sodium formate or their mixtures. In both of the two specific process protocols described more fully below, the central compartment 12 contains an electrolyte solution which may be the decontamination solution itself or another material, preferably formic acid or its salts. In the batch-type process, the electrolyte can be added to the central compartment 12 after the flow of waste solution to the cell has been stopped. In a continuous mode, the decontamination solution itself is the electrolyte.

The selection of the specific cation exchange resin 18 to be used in the central compartment 12 is also within the skill of the ordinary artisan, without the need for undue experimentation. The cation exchange resin selection process is guided by factors which include: the composition of the waste stream to be treated, the binding capacity of the resin, the cost of the resin and the ability of the resin to release its captured cations to enable substitution by hydrogen ions. In our particularly preferred embodiment, we use Amberlyte 120(H) because it is already commonly used in decontamination processes of this type. Other strong acid cation resins can be used in place of Amberlyte 120(H).

Similarly, the selection of the cation permeable membrane 18 is within the skill of the ordinary artisan. Representative materials include commercially available BDH Cation Exchange Membrane and Nafion membranes. Others may be substituted. When choosing a cation-permeable membrane, the selection is guided by the ion transport characteristics and durability of the membrane materials.

A significant potential problem which may arise in the operation of an electrochemical cell in this manner relates to the potential chemical back-diffusion of ions through the cation permeable membrane, counter to the direction of the applied electrical field. This problem is most acute when a steep ion concentration gradient exists between the cation compartment and the central compartment as a result of previous electrochemical migration. This potential problem is minimized or eliminated by the appropriate choice of cation permeable membrane materials, coupled with the relatively low mobility of transition metal ions, and the efficient deposition of the metal ions on the cathode, or the rapid precipitation of cations in the cathode compartment. The proper rate of metal reduction at the cathode will keep the metal ion concentration at lower levels in the cathode compartment which do not favor undesirable chemical back diffusion.

In a LOMI solution, for example, the change in concentration of species in the cathode compartment (in the absence of metal deposition at the cathode) is related to the electric current in the following way.

$$\frac{d[Fe]}{2dt} + \frac{d[V]}{3dt} + \frac{d[Na]}{dt} = \frac{i}{FV} \qquad \text{(Eqn 1)}$$

where i is the current in amps, V is the cathode compartment volume, and F is Faraday's constant. This equation is simplified because it ignores picolinic acid, but it is useful in estimating the current and the appropriate operating conditions.

The deposition efficiency for a metal at the cathode is given by:

$$\frac{dM}{dt} = \frac{E_m i}{F} \qquad \text{(Eqn 2)}$$

where M is the number of equivalents of the metal deposited, and $E_m$ is the current efficiency of plating metal M. At steady state, the rate of deposition of metal equals the appropriate term in Eqn 1. It is important to note that the terms on the left hand side of Eqn 1 are independent. Indeed in some circumstances one term may be negative if the chemical back-diffusion exceeds the electrical forward diffusion of that ion (as an example, at steady state $$\frac{d[Na]}{dt}$$

is zero). When determining the cell current requirements, the current must be sufficient to ensure that the term $$\frac{dM}{dt}$$

achieves the desired removal rate of metal M from the system.

The fundamental principles of operation of the instant process are best described with reference to schematic diagram of FIG. 1. The "spent" decontamination solution (in the present example, LOMI solution) is passed through the cation exchange resin 18 in the central compartment 12 of the cell 10. The cation exchange resin 18 removes the radioactive contaminants, metallic impurities (e.g., iron) and the vanadium added to achieve decontamination in the LOMI process from the "spent" decontamination solution. According to a first embodiment, no electric current is applied to the anode and cathode at the time that "spent" decontamination solution is being flowed through the cation exchange resin. In this first embodiment, current is only applied subsequent to the flowing step.

As the ion exchange resin approaches its cation loading capacity, the cell 10 is taken out of service, i.e., no more spent decontamination solution is fed to the central compartment 12. In practice, the decontamination solution would be diverted to another cell similarly configured operating in parallel with the first electrochemical cell. The chemistry of the isolated cell 10 is then adjusted to maximize its conductivity by the addition of an electrolyte, e.g., formic acid or its salts, to the central compartment.

After the electrolyte has been added to the central compartment 12, electric current is applied to the electrodes in the cell. Since the anode compartment 16 contains an acidic solution, the electric current applied to the cell electrodes causes hydrogen ions to migrate from the anode compartment 16 into the central compartment 12. The hydrogen ions replace the previously captured metallic ions present on the cation exchange resin 18. The metallic ions liberated from the resin 18 then migrate from the central compartment 12, through the cation-permeable membrane 20 and into the cathode compartment 14. The cathode compartment chemistry can then be adjusted to cause the metallic ions in the cathode compartment to plate on the cathode as a metallic deposit for subsequent disposal in the solid form.

To obtain efficient plating, in the preferred embodiment, the cathode compartment 14 contains a mixture of formic acid and sodium formate. pH of the cathode compartment solution should not be too low, otherwise hydrogen will be preferentially discharged. If the pH of the solution in cathode compartment 14 is too high, metal hydroxides will precipitate preferentially to metal deposition on the cathode. We have found pH=4.0 to be acceptable to prevent hydroxide precipitation and to prevent hydrogen evolution. This may not be optimum in all cases.

In the second embodiment, the continuous mode of operation, electric current is passed between anode and cathode while the spent decontamination solution passes through the cation exchange resin 18. This continuous mode does not involve the separate addition of formic acid or its salts to provide an electrolyte in the central compartment 12.

For the purposes of describing the application of this process to actual plant conditions, we have simulated the decontamination of an 8,000 gallon BWR sub-system (e.g., Suction or Discharge) with LOMI solution with a target decontamination time not to exceed approximately eight hours, with six hours clean-up time. Total vanadium usage would be 5 kg, equivalent to 5 kg iron removed.

Another assumption made for this purposes of this description is that the picolinic acid added is six times the iron concentration at its average anticipated level (75 ppm). The iron in solution may rise above this level for a short period.

The process equipment envisioned for the present invention, as shown in FIG. 2, is an electrochemical cell unit 26, conventional anion exchange resin 28, including a small proportion of cation resin in resin bed 28, a pump 30 and conventional chemical injection skids 32.

Electrochemical cell 26 consists of ten cells constructed as a "sandwich", each having 1 meter square area, and a resin compartment thickness of about two centimeters. The total cation resin volume in cell 26 is approximately 200 liters (7 cubic feet). The regular anion exchange vessel 28 consists of about 20 cu. ft. of anion resin with a small proportion of cation resin.

FIG. 2 illustrates sequential operation of the decontamination circuit, with bold lines representing fluid flow in that step. First, picolinic acid (about 30 kg) and about one third of the sodium hydroxide is added to the system, followed by about one third of the vanadous formate (chemical injection 32, FIG. 2a). Once mixing is established and while subsystem decontamination is taking place, the electrochemical cell 26 would be valved in to the circulation at a continuous flow rate of approximately 20 gpm. See FIG. 2b. Periodically, additional vanadous formate and sodium hydroxide is added to the system (chemical injection 32), until the total amount added is equivalent to that used in a normal decontamination process. Optionally, some of the electrochemical cell cathode solution (which contains regenerated vanadium (II) and sodium) could be added in place of fresh chemical, although this would inevitably return some iron and activity to the system. See FIG. 2b. When the decontamination reaches completion, the anion exchange vessel resin 28 would be valved into the system followed by opening a by-pass flow to speed the final clean-up. See FIG. 2c. Finally, following termination of the decontamination (in off-line mode), the cation exchange resin in the central compartment of cell 26 is regenerated to make it ready for a subsequent decontamination. See FIG. 2d.

For the next decontamination cycle, the anion exchange resin 28 would have to be changed, but the electrochemical cell 26 could, of course, be used again without changing resin.

The invention will now be described with reference to examples which are intended to illustrate and not to limit the scope of the present invention.

EXAMPLE 1

Figure 3:
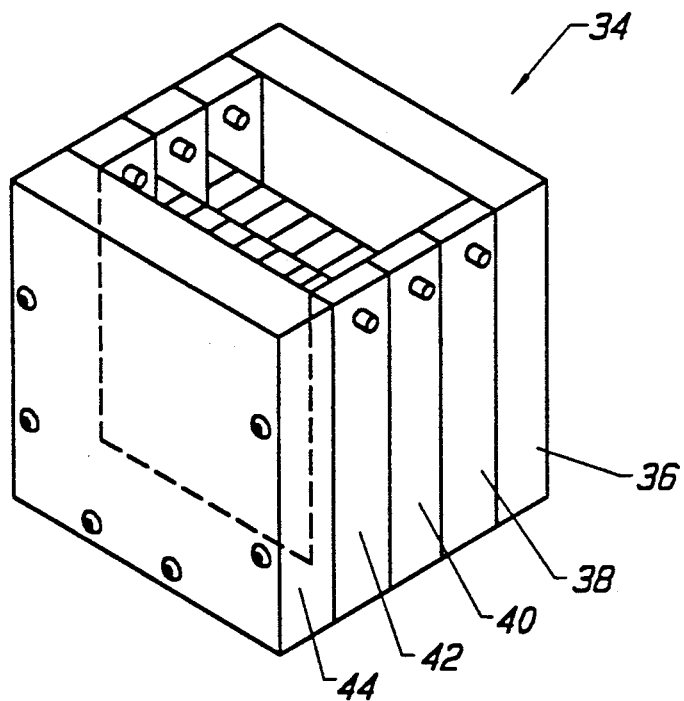
FIG. 3 is a perspective view of a laboratory scale cell having a central compartment containing ion exchange resin surrounded by an anode compartment and a cathode compartment.
Figure 2A:
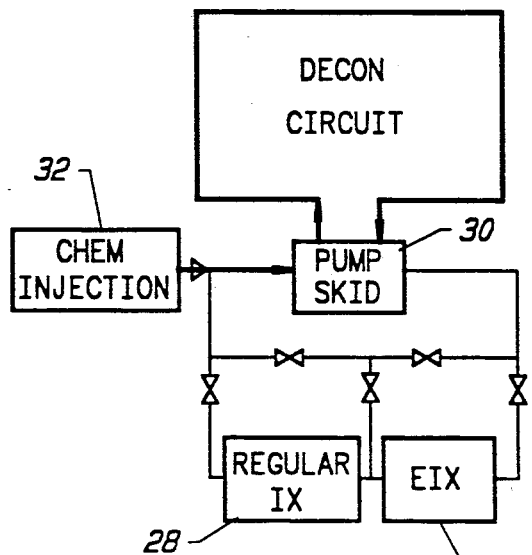
FIGS. 2a through 2d are process flow diagrams showing the sequential operation of a decontamination circuit, including an electrochemical cell according to the present invention.
Figure 2B:
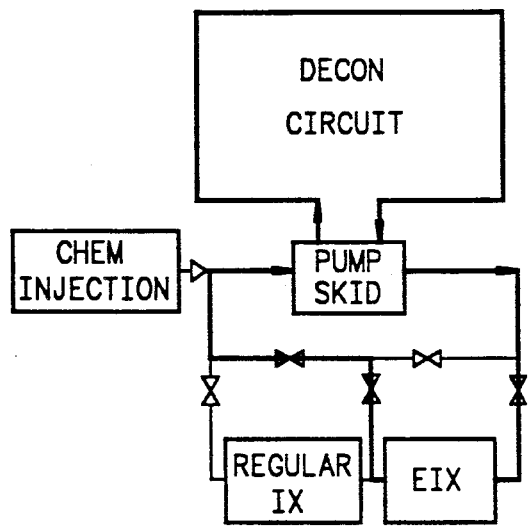
Figure 2C:
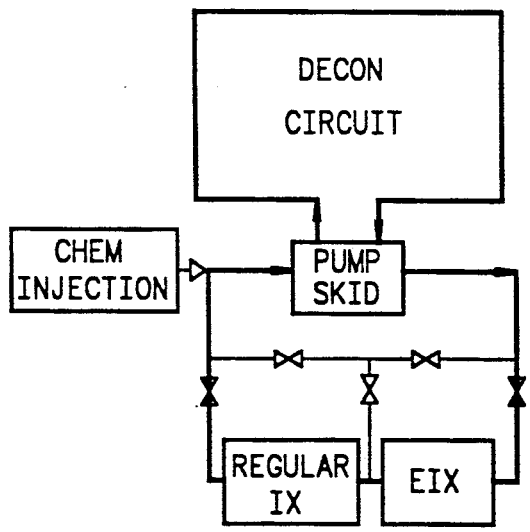
Figure 2D:
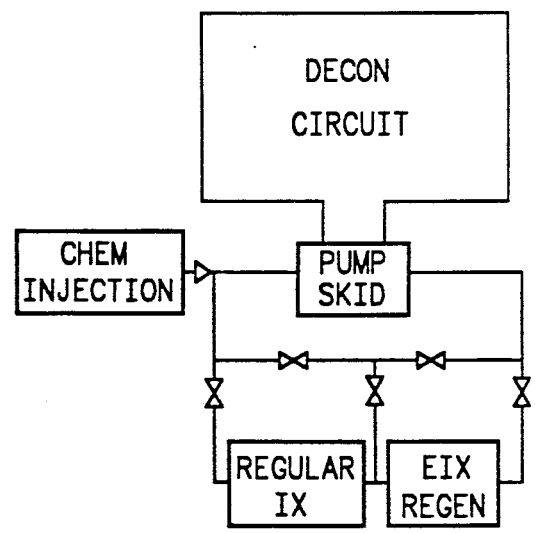

As shown in FIG. 3, a laboratory electrochemical ion-exchange cell 34 is constructed of perspex and comprises five 2 cm thick by 10 cm×10 cm sheets 36-44 sealed and bolted together, the middle three sheets 38, 40 and 42 having been machined to form a U-piece. The cell divisions are created by sandwiching membrane sheets between the central U-piece and the two adjacent U-pieces.

The cell 34 allows flow in the anode and cathode compartments, with additional equipment such as cooling/heating coils, electrodes and thermometers for control of experimental conditions. The anode and cathode compartments are typically filled with solutions of sodium formate or formic acid to enable proper operation. The electrodes are typically precious metal (platinum) anode and stainless steel cathode. The cell auxiliary equipment is positioned and held by a series of holes or ports in the cell lid, not shown in FIG. 3.

EXAMPLE 2

A commercially available electrolysis unit can been modified for the purposes of demonstration of the process of the instant invention. An example of this type of equipment is the Dished Electrode Membrane ("DEM") Cell, licensed by the UK Electricity Council. The DEM Cell is an electrochemical reactor based on "plate and frame" principles of assembly. The dished electrode design maximizes efficiency by using a narrow electrode-membrane gap. To avoid electrolyte depletion the anolyte or catholyte is pumped between the electrode face and membrane.

DEM cells are normally supplied with a single membrane dividing the anode and cathode chambers. The cell is modified for the process of the instant invention by the addition of central section with a membrane on each side to create three compartments, the central one holding cation exchange resin. A number of such cell units can be stacked in a single assembly.

EXAMPLE 3

A laboratory cell was constructed as outlined above in Example 1, and operated in the second, continuous embodiment described above. Ten resin bed volumes per hour of spent simulant LOMI decontamination solution were passed at 85° C. through the central compartment for ten hours. The anode solution was 3M formic acid to supply hydrogen ions with 1 amp current. After resin loading with metal ions was complete, the cation exchange resin in the central compartment was regenerated with sodium ions by replacing the anode solution with sodium formate.

In this experiment no iron or vanadium was found in the ion exchange outlet. The picolinic acid was eluted from the ion exchange column at initially less than the feed concentration, but equalled and then exceeded the feed concentration towards the end of the run.

43% of the influent iron was found to have migrated into the cathode compartment during the loading cycle. Some of this iron was deposited as metal on the cathode. The deposit was 87% metal by weight, the remainder being organic. Of the metal deposit 93% was iron and 7% vanadium. This indicates that hydrogen ions were replacing the metal ions captured on the cation exchange resin.

Following completion of the loading, the remainder of the iron and vanadium were transported from the cation exchange resin in the central compartment to the cathode compartment, and the cation exchange resin was readied for further duty by the following steps:

a) further removal of iron and vanadium from cation exchange resin by electrochemical cell operation with sodium formate solution in the anode compartment.

b) regeneration of cation exchange resin to hydrogen form using 3M formic acid, (creates sodium formate solution for next run).

c) rinse cation exchange resin with demineralized water to pH 4.3.

What is claimed is:

1. A process for removing the radioactive burden from spent nuclear reactor coolant system decontamination solutions comprising the steps of:

a) providing an electrochemical cell with electrolytes, said cell having a central compartment containing cation exchange resin with capture sites and bounded by a cation-permeable membrane;

an anode compartment containing electrolyte and an anode; and, a cathode compartment containing electrolyte and a cathode, said cell central compartment in ion-communicating relationship with said anode compartment and with said cathode compartment;

b) flowing spent nuclear reactor coolant system decontamination solution into and out of said central compartment cation exchange resin to capture radioactive components and metallic impurities from said decontamination solution on said resin capture sites until said cation exchange resin approaches full loading of its capture sites;

c) stopping the flow of said decontamination solution into said central compartment when said resin capture sites are substantially fully loaded;

d) adding electrolyte to said cell central compartment to increase the conductivity of the solution present in said central compartment;

e) applying electric current to said cell through its anode and cathode thereby causing hydrogen ions to migrate from said anode compartment through said cation permeable membrane and into said central compartment where said hydrogen ions replace the captured metal ions present on the cation exchange resin capture sites, and where metal ions liberated from said cation exchange resin by said hydrogen ions migrate through said cation-permeable membrane into said cathode compartment; and, f) removing said metal ions from said cathode compartment.

2. The process of claim 1 wherein said step (f) involves adjusting said cathode compartment chemistry to cause metal ions in said cathode compartment to plate onto said cathode as a metallic deposit.

3. The process of claim 1 wherein said spent low oxidation-state metal ion decontamination solution is spent LOMI decontaminant solution.

4. The process of claim 1 wherein said electrochemical cell electrolyte is an electrolyte selected from a group consisting of formic acid and its salts.

5. The process of claim 1 wherein said electrochemical cell electrolyte added to said central compartment in step (d) is formic acid.

6. The process of claim 1 wherein said anode is coated with materials selected from the group consisting of platinum, ruthenium dioxide and their mixtures.

7. The process of claim 1 wherein said cathode is constructed from stainless steel.

8. A continuous process for removing the radioactive burden from spent nuclear reactor coolant system decontamination solutions comprising the steps of:
   a) providing an electrochemical cell with electrolytes, said cell having
      a central compartment containing cation exchange resin with capture sites and bounded by a cation-permeable membrane;
      an anode compartment containing electrolyte and an anode; and,
      a cathode compartment containing electrolyte and a cathode,
      said cell central compartment in liquid-communicating relationship with said anode compartment and with said cathode compartment;
   b) flowing spent nuclear reactor coolant system decontamination solution into and out of said central compartment cation exchange resin to capture radioactive components and metallic impurities from said decontamination solution on said resin capture sites;
   c) applying electric current to said cell through its anode and cathode thereby causing hydrogen ions to migrate from said anode compartment through said cation permeable membrane and into said central compartment where said hydrogen ions replace the captured metal ions present on the cation exchange resin capture sites, and where metal ions liberated from said cation exchange resin by said hydrogen ions migrate through said cation-permeable membrane into said cathode compartment; and,
   d) removing said metal ions from said cathode compartment.

9. The process of claim 8 wherein said step (e) involves adjusting said cathode compartment chemistry to cause metal ions in said cathode compartment to plate onto said cathode as a metallic deposit.

10. The process of claim 8 wherein said spent decontamination solution is spent LOMI decontamination solution.

11. The process of claim 8 wherein said electrochemical cell electrolyte is an electrolyte selected from a group consisting of formic acid and its salts.

12. The process of claim 8 wherein said anode is coated with a material selected from the group consisting of platinum, ruthenium dioxide and their mixtures.

13. The process of claim 8 wherein said cathode is constructed from stainless steel.

* * * * *